2,902,585

ELECTRO-EROSION OF METALS

John Lewis Adcock, Kenilworth, England, assignor to Wickman Limited, Coventry, England No Drawing. Application November 26, 1957
Serial No. 698,913

Claims priority, application Great Britain
December 5, 1956

5 Claims. (Cl. 219—69)

This invention relates to the forming of holes of small diameter by electro-erosion in metal articles, and particularly articles made from hard metals such as sintered tungsten carbide.

Hitherto difficulty has been experienced in forming a straight hole of for example, 0.125 inch diameter and 2 inches long. The difficulty increases greatly in forming holes of smaller diameter and less length. In fact it has been regarded hitherto as an exceptional achievement to form a hole of 0.008 inch diameter and 0.060 inch long. The difficulty appears to be due at least in part to short circuiting of the spark gap by metal particles detached from the work-piece or electrode and consequential excessive formation of gas at the spark gap and almost complete displacement of the liquid dielectric from the gap, with resultant interruption of the normal action of the spark.

It is known to employ tubular electrodes for forming holes or recesses of about 0.26 inch diameter, and to pump liquid dielectric to the spark-gap in order to reduce occurrence of short-circuiting. Employment of tubular electrodes for forming holes of smaller diameter has hitherto been regarded as impracticable owing to liability to formation of a core by trepanning. Such a core is liable to obstruct the flow of dielectric, and in the formation of blind holes, the core is difficult to remove.

To some extent the above-mentioned difficulties have been reduced hitherto by employing a wire as distinct from a tubular electrode tool, and by imparting endwise reciprocation to the work-piece or electrode, but this does not ensure a flow of dielectric into the spark-gap.

The present invention is concerned with the formation of holes (referred to in the claims hereinafter as "holes of the kind referred to") of 0.065 inch diameter and less, the length being from several to many times the corresponding diameter.

The above difficulties have been reduced by the present invention, according to which a steady stream of clean liquid dielectric is forced through a bore in a straight tubular electrode to the spark-gap between the operative end of the electrode and the work-piece, a trepanning action being avoided as herein described, and the electrode being supported by a guide located closely adjacent to the face of the workpiece.

If the electrode bore at the operative tip of the electrode is eccentric to the longitudinal axis of the electrode, a trepanning action can be avoided by rotation of the electrode. When the bore is concentric with the axis, the trepanning action can be avoided by making the electrode bore diameter as nearly as practicable not more than twice the length of the spark-gap between the electrode and the workpiece.

In one example for the formation of a hole of 0.05" diameter, a hollow straight electrode made from brass or other convenient and suitable metal is used, the outside diameter of the electrode being 0.045 inch and the bore 0.005 inch diameter. The sparking voltage applied is such as will cause sparking to occur of a gap of 0.0025 inch between the operative end of the electrode and the workpiece. The diameter of the bore of the electrode is an important factor. If too large, a trepanning action is liable to occur, causing a core to be formed at the bottom of the hole which can obstruct the bore of the electrode. The dielectric is kerosene and it is essential that the kerosene shall be clean. The kerosene is forced through the interior of the electrode under a pressure of, for example, 80 pounds per square inch, care being taken that the kerosene stream is free from pulsations. After passing through the electrode the kerosene is discharged through the annular space between the electrode and the hole. For supporting the electrode it is caused to move through a guide located at about 0.06 inch from the face of the work piece. In this example a straight hole of 3.5 inch length can be produced in hard metal.

It will be understood, however, that the invention is not limited to the above example, the main purpose of the example being to indicate the approximate relative proportions of the internal and external diameters of the electrode, the size of the spark gap, and an appropriate pressure at which the dielectric is forced through the electrode. To neutralize any adverse effect attributable to eccentricity of the bore of the electrode or distortions due to strains in the electrode, it is desirable to rotate the electrode about its longitudinal axis. Moreover, it is sometimes advantageous to vibrate the work piece relative to the electrode and in a direction parallel with the direction of the longitudinal axis of the latter, while the electrode is in action; such vibration also minimises risk of arcing at the spark gap.

Having thus described my invention what I claim as new and desire to secure by Letters Patent is:

1. A method of forming holes of .065 inch diameter and less in metal workpieces by electro-erosion, wherein a straight tubular shaping electrode is employed, a spark-gap is maintained between a workpiece and the operative end of the electrode at a spacing of not more than half the internal diameter of the electrode, a nonpulsating stream of clean liquid dielectric is forced through the electrode to the gap, a succession of electric discharges is passed across the gap, and the electrode is supported closely adjacent to the face of the workpiece.

2. A method as and for the purpose claimed in claim 1 in which a rotary motion is imparted to the electrode about the longitudinal axis thereof.

3. A method as and for the purpose claimed in claim 1 in which a relative vibratory movement parallel with the direction of the longitudinal axis of the electrode is imparted to the work piece and electrode, the movement being such as periodically to enlarge then restore the gap.

4. A method of forming holes in metal workpieces by electro-erosion, consisting in combining with the steps of employing a straight tubular shaping electrode the bore whereof is eccentric to the longitudinal axis of the electrode, rotating the electrode about said axis, maintaining a spark-gap between a workpiece and the operative end of the electrode, passing a succession of electric discharges across the gap, and forcing a stream of liquid dielectric through the electrode to the gap, the steps of employing an electrode of a diameter of the order of .065 inch and less, employing a non-pulsating stream of liquid dielectric and a spark-gap spacing of not more than half the internal diameter of the electrode, and supporting the electrode closely adjacent to the face of the workpiece.

5. A method as and for the purpose claimed in claim 4 in which a relative vibratory movement parallel with the direction of the longitudinal axis of the electrode is imparted to the workpiece and electrode, the movement being such as periodically to enlarge then restore the gap.

References Cited in the file of this patent

UNITED STATES PATENTS 2,385,665   Warwick _____ Sept. 25, 1945

FOREIGN PATENTS 727,681   Great Britain _____ Apr. 6, 1955